(12) United States Patent
Yoshihara et al.

(10) Patent No.: US 7,038,905 B2
(45) Date of Patent: May 2, 2006

(54) CAPACITOR

(75) Inventors: Yumiko Yoshihara, Tokyo (JP);
Masaaki Kobayashi, Tokyo (JP);
Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/013,696

(22) Filed: Dec. 17, 2004

(65) Prior Publication Data

US 2005/0213287 A1    Sep. 29, 2005

(30) Foreign Application Priority Data

Dec. 26, 2003  (JP) ............................ P2003-434105

(51) Int. Cl.
 *H01G 4/228* (2006.01)
 *H01G 9/04* (2006.01)
 *H01G 9/145* (2006.01)
(52) U.S. Cl. .................... 361/540; 361/533; 361/528
(58) Field of Classification Search ................ 361/523, 361/528–529, 532–541
See application file for complete search history.

(56) References Cited

U.S. PATENT DOCUMENTS

| | | | |
|---|---|---|---|
| 6,816,358 B1 * | 11/2004 | Kida et al. | 361/540 |
| 2003/0103320 A1 * | 6/2003 | Shimada et al. | 361/508 |
| 2004/0165338 A1 * | 8/2004 | Arai et al. | 361/502 |
| 2004/0251558 A1 * | 12/2004 | Kida et al. | 257/777 |

FOREIGN PATENT DOCUMENTS

| | | | |
|---|---|---|---|
| JP | 7-240351 | * | 9/1995 |
| JP | 10-163072 | * | 6/1998 |
| JP | B2 3128831 | | 11/2000 |

* cited by examiner

*Primary Examiner*—Eric W. Thomas
(74) *Attorney, Agent, or Firm*—Oliff & Berridge, PLC

(57) ABSTRACT

A capacitor comprises a laminate constituted by a plurality of laminated capacitor elements each including an anode terminal and a cathode terminal; and an object to be connected including a terminal having the anode terminal electrically connected thereto. The respective anode terminals of one capacitor element and another capacitor element in the laminate oppose a partial region and a region different from the partial region in the terminal of the object.

9 Claims, 10 Drawing Sheets

CAPACITOR

BACKGROUND OF THE INVENTION

1. Field of the Invention

The present invention relates to a capacitor; and, in particular, to a laminated capacitor in which a plurality of elements are laminated.

2. Related Background Art

Known capacitor elements include ceramic capacitors using porcelain compositions as dielectrics, and electrolytic capacitors using oxidized films as dielectrics while employing electrolytes as substantial cathodes. These capacitor elements are often used in the form of a laminated capacitor in which a plurality of such elements are laminated in order to achieve a larger capacity.

Among those mentioned above, the electrolytic capacitor elements have been known to be able to achieve a relatively large capacity. Widely known as the electrolytic capacitor elements are those having a configuration in which a part of a support made of a so-called valve metal such as aluminum, titanium, brass, nickel, or tantalum is used as an anode terminal, whereas a dielectric layer made of an insulating oxidized film formed by anode-oxidizing a surface of the valve metal support, an electrolyte layer substantially functioning as a cathode, and a cathode terminal made of a conductor layer such as graphite or silver functioning as a cathode take-out electrode are disposed on the surface of the support excluding the anode terminal part.

When used as a laminate, these electrolytic capacitor elements are laminated and connected such that their anode terminals overlap each other and their cathode terminals overlap each other. In general, the electrolytic capacitor elements in thus laminated state are mounted on a substrate or lead frame equipped with respective terminals to which the anode and cathode terminals are connected.

For example, Japanese Patent No. 3128831 discloses an electrolytic capacitor in which a plurality of laminated electrolytic capacitor elements are mounted on a frame (comb) made of a metal having a predetermined form, anode terminals in the capacitor elements are held by an anode mounting part (terminal) in the metal frame and then welded together, so that the anode terminals are connected to each other and secured to the anode mounting part.

SUMMARY OF THE INVENTION

However, connections between anode terminals have been insufficient in capacitor elements in capacitors in which a plurality of capacitor elements in a laminated state are mounted on a substrate or lead frame as in the prior art mentioned above. Hence, there have been elements whose anode terminals are not sufficiently secured to terminals of an object to be connected such as the substrate in the capacitors. Such an electrolytic capacitor is likely to incur disadvantages such as failures to attain a desirable capacitance and peeling between the respective anode terminals of the elements, because of inferior connections between the anode terminals.

In view of such circumstances, it is an object of the present invention to provide a laminated capacitor in which anode terminals of capacitor elements are sufficiently secured to an object to be connected.

Studies by the inventors revealed, when there were a large number of anode terminals to be welded in the case where the anode terminals were secured to terminals in a substrate or the like by welding as in the prior art, a laser used for the welding could not sufficiently reach all the anode terminals, whereby the welding of the anode terminals was likely to become insufficient. When welding was performed with a higher output so as to be effected sufficiently, on the other hand, there were cases where a laser having an excessive output destroyed anode terminals located at a surface layer part.

In view of such a finding, the inventors further conducted diligent studies and, as a result, have found that anode terminals in capacitor elements can be secured to terminals in a substrate or the like in a simple and sufficient manner when the number of anode terminals to be connected to a predetermined terminal of the substrate or the like is reduced, thereby completing the present invention.

(1) Namely, the capacitor in accordance with one aspect of the present invention comprises a laminate constituted by a plurality of laminated capacitor elements each including an anode terminal and a cathode terminal; and an object to be connected including a terminal to which the anode terminal is electrically connected; the anode terminal of one capacitor element in the laminate oppose a partial region in the terminal of the object, and the anode terminal of another capacitor element oppose a region different from the partial region in the terminal of the object.

In this capacitor, the anode terminals of one capacitor element and another capacitor element oppose different regions of the terminal acting as an anode connecting part in the object to be connected, respectively. Namely, the capacitor elements are laminated such that the anode terminals arranged in a row in the laminating direction hardly overlap each other. This can reduce the number of overlapping anode terminals in the laminate, whereby the laminate can be secured to the object to be connected in a quite favorable state. In this specification, the state where "the anode terminal opposes the terminal of the object to be connected" refers to a state where a projection of the anode terminal overlaps the terminal of the object to be connected.

Preferably, in such a capacitor, the respective anode terminals in one capacitor element and another capacitor element do not overlap each other in the laminating direction of the capacitor elements. This configuration keeps the anode terminals from coming into contact with each other, whereby the anode terminals can be secured more favorably to terminals in the object to be connected.

Preferably, in thus configured capacitor, the respective cathode terminals in a plurality of capacitor elements constituting the laminate are connected to each other by way of a conductive adhesive. This can yield an electrolytic capacitor with a large capacity utilizing a plurality of capacitor elements.

Preferably, the anode terminal in each capacitor element is connected to the terminal in the object by welding. This can easily secure the anode terminals of the elements to each other, and secure the laminate to the object, whereby they are electrically connected to each other in a favorable state.

(2) The capacitor in accordance with another aspect of the present invention comprises a laminate constituted by a plurality of laminated capacitor elements each including an anode terminal and a cathode terminal; and an object to be connected including a plurality of terminals to which the anode terminal is electrically connected; wherein the respective anode terminals of one capacitor element and another capacitor element in the laminate are connected to different terminals of the object.

In this capacitor, respective anode terminals in at least two elements in a plurality of capacitor elements are connected to different terminals (anode connecting parts) of the object to be connected. Namely, the capacitor elements are laminated such that the anode terminals arranged in a row in the laminating direction do not overlap each other. This can reduce the number of overlapping anode terminals in the laminate, whereby the laminate can be secured to the object in a quite favorable state.

Preferably, in thus configured capacitor, the respective cathode terminals in a plurality of capacitor elements constituting the laminate are connected to each other by way of a conductive adhesive. This can yield an electrolytic capacitor with a large capacity utilizing a plurality of capacitor elements.

Preferably, the anode terminals in the capacitor elements are connected to the respective terminals in the object by welding. This can easily secure the anode terminals of the elements to each other, and fix the laminate to the object, whereby they are electrically connected to each other in a favorable state.

DESCRIPTION OF THE PREFERRED EMBODIMENTS

Figure 1:
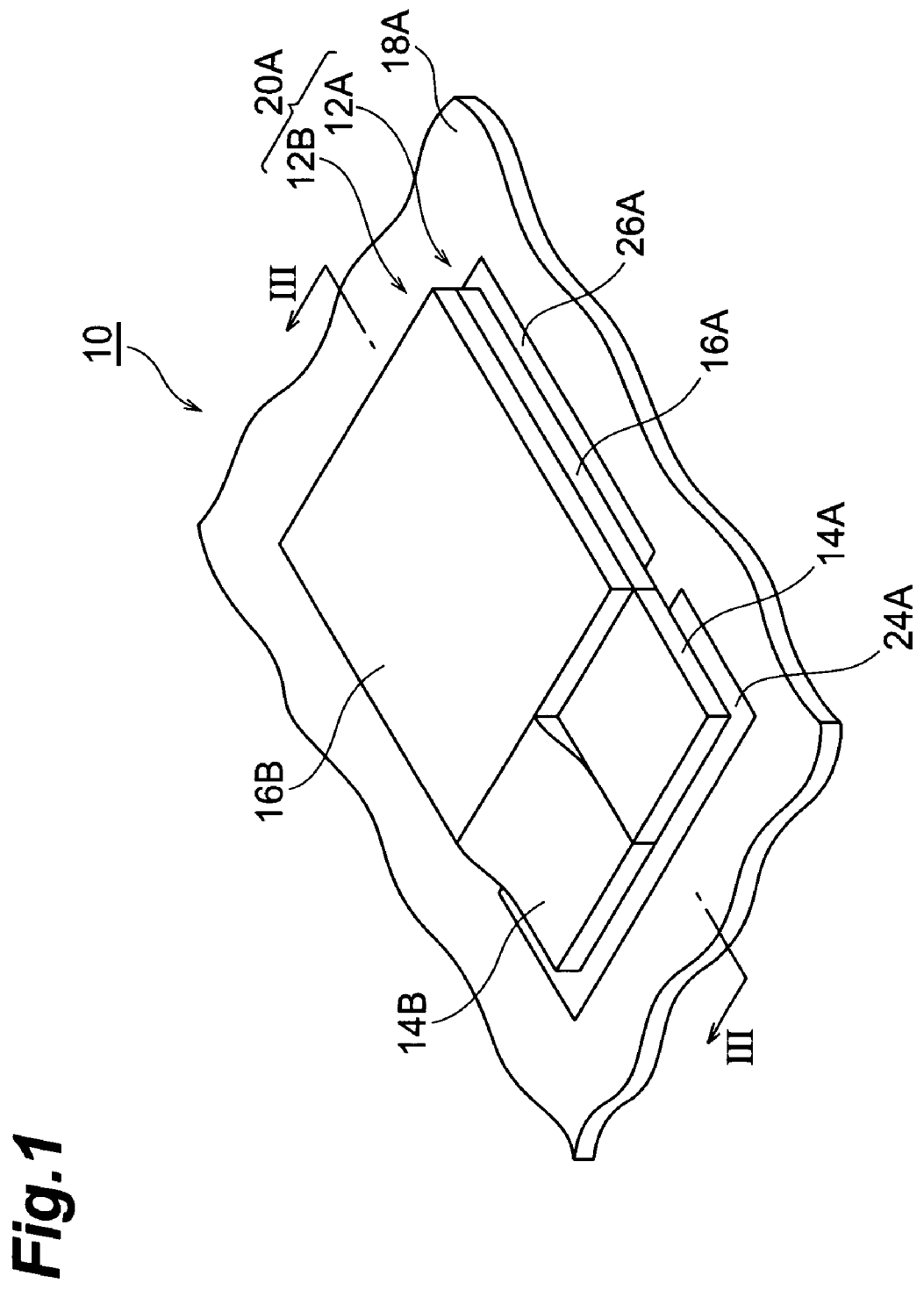
FIG. 1 is a perspective view showing the electrolytic capacitor in accordance with a first embodiment.

In the following, preferred embodiments of the present invention will be explained in detail with reference to the drawings. Constituents identical to each other will be referred to with numerals identical to each other without repeating their overlapping descriptions. Positional relationships such as upper/lower and left/right will be based on those in the drawings.

FIRST EMBODIMENT

Figure 2:
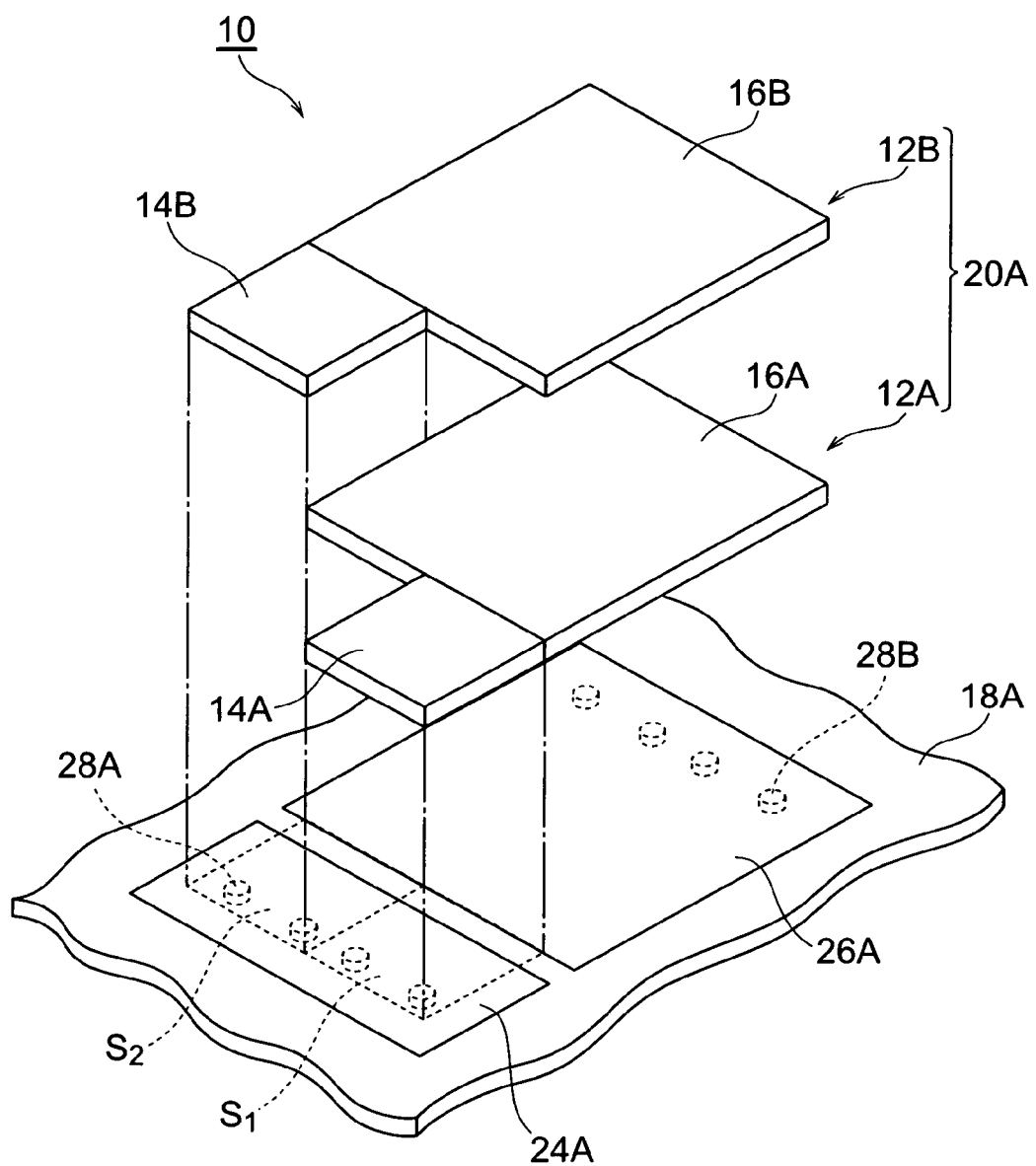
FIG. 2 is an exploded perspective view of the electrolytic capacitor shown in FIG. 1.
Figure 3:
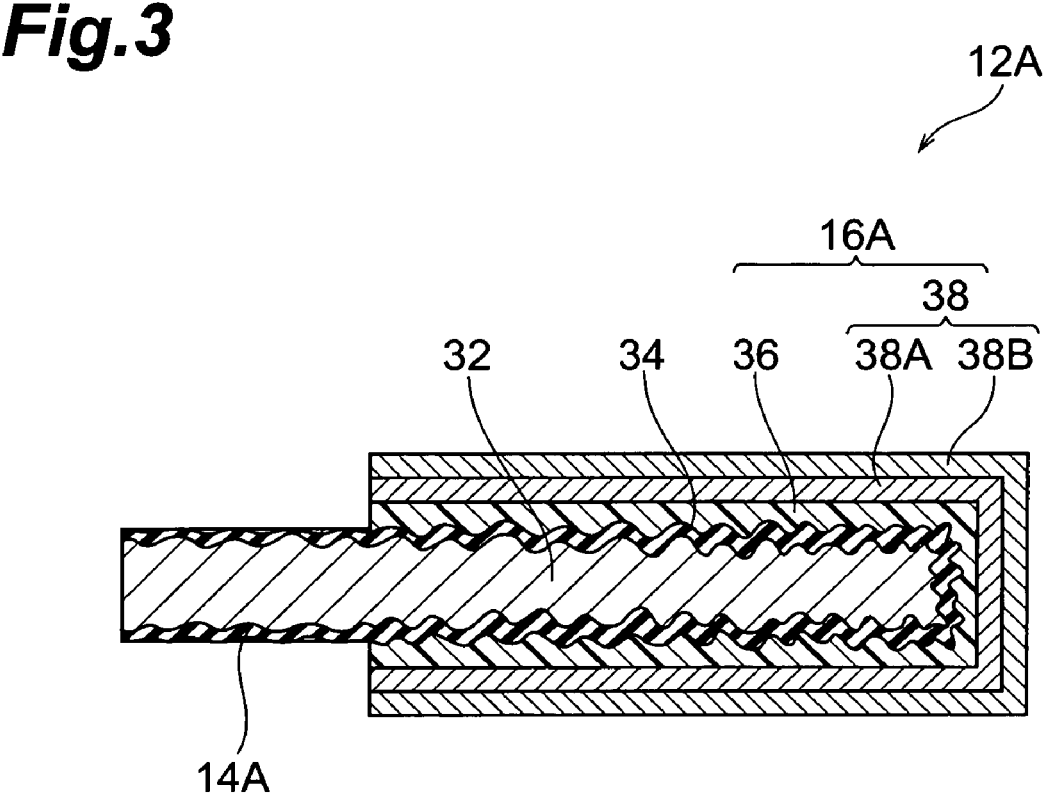
FIG. 3 is a sectional view of a capacitor element 12A taken along the line III—III of FIG. 1.

With reference to FIGS. 1 to 3, the electrolytic capacitor in accordance with the first embodiment of the present invention will be explained. FIG. 1 is a perspective view showing the electrolytic capacitor in accordance with the first embodiment. FIG. 2 is an exploded perspective view of the electrolytic capacitor shown in FIG. 1.

The electrolytic capacitor 10 has a structure in which a laminate 20A constituted by capacitor elements 12A and 12B is mounted on a substrate 18A (object to be connected).

The substrate 18A has an anode connecting part (terminal) 24A and a cathode connecting part 26A which are arranged in a row on a main surface mounted with the laminate 20A. A plurality of through holes 28A extending along the thickness of the substrate 18A are formed in the area formed with the anode connecting part 24A in the substrate 18A. On the other hand, a plurality of through holes 28B are formed in the area formed with the cathode connecting part 26A in the substrate 18A. The through holes 28A and 28B connect the anode connecting part 24A and the cathode connecting part 26A to connecting terminals, wiring, and the like (not depicted) formed on the rear face (the surface on the side opposite from the main surface).

The laminate 20A is formed by successively laminating the capacitor elements 12A and 12B from the substrate 18A side. The capacitor element 12A is a so-called double terminal type capacitor element having a cathode terminal 16A in a thin sheet form which appears rectangular when seen as a plane, whereas an anode terminal 14A is drawn out from one side of the cathode terminal 16A. The anode terminal 14A is formed in an area extending from the center of the above-mentioned side of the cathode terminal 16A to an end part thereof. The capacitor element 12B is constituted by an anode terminal 14B and a cathode terminal 16B, and has the same form and inner configuration as with the capacitor element 12A.

With reference to FIG. 3, the capacitor element 12A will be explained in more detail. FIG. 3 is a sectional view of the capacitor element 12A taken along the line III—III of FIG. 1. All the capacitor elements in the electrolytic capacitors in embodiments which will be explained in the following have the same structure as that explained here. The capacitor element 12A includes a foil-shaped valve metal support 32, about which the cathode terminal 16A is formed. A surface layer of the valve metal support 32 is roughened (expanded), and a dielectric layer 34 is formed onto the surface layer of the valve metal support 32 by subjecting to chemical processing.

The valve metal support 32 is constituted by a so-called valve action metal such as aluminum, tantalum, niobium, titanium, hafnium, zirconium, zinc, tungsten, bismuth, or antimony. The part excluding the area formed with the cathode terminal in the valve metal support 32 constitutes the anode terminal 14A. In other words, the cathode terminal 16A covers the valve metal support 32 except for the anode terminal 14A.

The valve metal support 32 is in a state where its surface area is increased by an expanding process such as etching. Further, the surface is subjected to a predetermined chemical process (oxidization), whereby the dielectric layer 34 made of an insulating oxidized film is formed on the surface of the valve metal support 32. The anode terminal 14A in the capacitor element 12A is favorably secured to the substrate 18A by welding. In this case, simultaneously with the welding, its heat eliminates the dielectric layer 34 existing on the surface layer of the anode terminal 14A. In the capacitor element 12A, the dielectric layer 34 on the surface layer of the anode terminal 14A may be removed as well.

The cathode terminal 16A is constituted by an electrolyte layer 36 and a conductor layer 38 successively laminated from the valve metal support 32 side. More specifically, the electrolyte layer 36 covers the valve metal support 32 except for the anode terminal 14A, whereas the conductor layer 38 is formed about the electrolyte layer 32 so as to cover the latter. The electrolyte layer 36 substantially functions as a cathode, and is appropriately constituted by various materials which can function as an electrolyte. Examples of such materials include manganese dioxide, complex salts, and conductive polymers. The conductor layer 38 is provided as a cathode take-out electrode, and has a double layer structure constituted by a graphite paste layer 38A and a silver paste layer 38B. The conductor layer 38 is preferably constructed by laminating a plurality of conductive material layers as in this embodiment, but may be a single layer as well.

Referring to FIGS. 1 and 2 again, the overall configuration of the electrolytic capacitor 10 including such a capacitor element will be explained in detail. In the laminate 20A, the capacitor element 12B is superposed on the capacitor element 12A in a state reversed from the capacitor element 12A, more specifically in a state rotated by 180° from the capacitor element 12A about an axis along the longer side direction thereof.

Respective cathode terminals of the capacitor elements 12A and 12B are bonded to each other by way of a conductive adhesive, and thus are electrically connected to each other. The cathode terminal 16A of the lowermost capacitor element 12A in the laminate 20A opposes the cathode connecting part 26A of the substrate 18A, and they are connected to each other by way of a conductive adhesive.

The anode terminals 14A and 14B in the laminate 20A oppose the anode connecting part 24A of the substrate 18A. Here, the anode terminal 14A opposes a partial region of the abode connecting part 24A, whereas the anode terminal 14B opposes a region different from the partial region. Namely, the projection area (the area represented by $S_1$ in FIG. 2, which will hereinafter be referred to as "projection area $S_1$") of the anode terminal 14A onto the anode connecting part 24A and the projection area $S_2$ of the anode terminal 14B onto the anode connecting part 24A are deviated from each other and have respective regions not overlapping each other. In other words, the anode terminals 14A and 14B are formed at respective positions which do not overlap each other when the electrolytic capacitor 10 is seen as a plane. They may partly overlap each other in the electrolytic capacitor in accordance with the present invention. Namely, the above-mentioned projection areas $S_1$ and $S_2$ may partly overlap each other. The anode terminals 14A, 14B are connected to the anode connecting part 24A by welding or crimping.

The foregoing is the configuration of the electrolytic capacitor in accordance with this embodiment. Such an electrolytic capacitor yields the following effect. The anode terminals 14A, 14B are connected to the anode connecting part 24A of the substrate 18A in the mode mentioned above. Therefore, even though two layers of the capacitor elements 12A and 12B are laminated on the substrate 18A, substantially only one layer of anode terminal is connected to the anode connecting part 24A in the substrate 18A. Hence, the above-mentioned welding and crimping can be performed quite easily. As a result, the anode terminals 14A, 14B and the anode connecting part 24A are favorably connected to each other, whereby the laminate 20A is secured to the substrate 18A in a favorable state.

Thus configured electrolytic capacitor is not limited to the mode mentioned above but may be in other modes. For example, three or more layers including respective anode terminals whose projection areas on the anode connecting part 24A do not overlap each other may be laminated. In this case, even when a plurality of layers of capacitor elements are laminated, substantially only one layer of anode terminal is connected to the anode connecting part 24A, whereby the anode terminals and anode connecting part 24A keep a favorable state of connection. In practice, however, the number of laminated capacitor elements is preferably about 2 to 5, since the anode terminals become too small and harder to connect or worsen their characteristics when the number of laminated layers is too large.

Though exemplified by the substrate 18A in this embodiment, the object to be connected is not restricted to the substrate mode in particular, as long as it has a structure to which the anode and cathode terminals in the capacitor elements are connectable. An example of such an object to be connected is a lead frame.

SECOND EMBODIMENT

Figure 4:
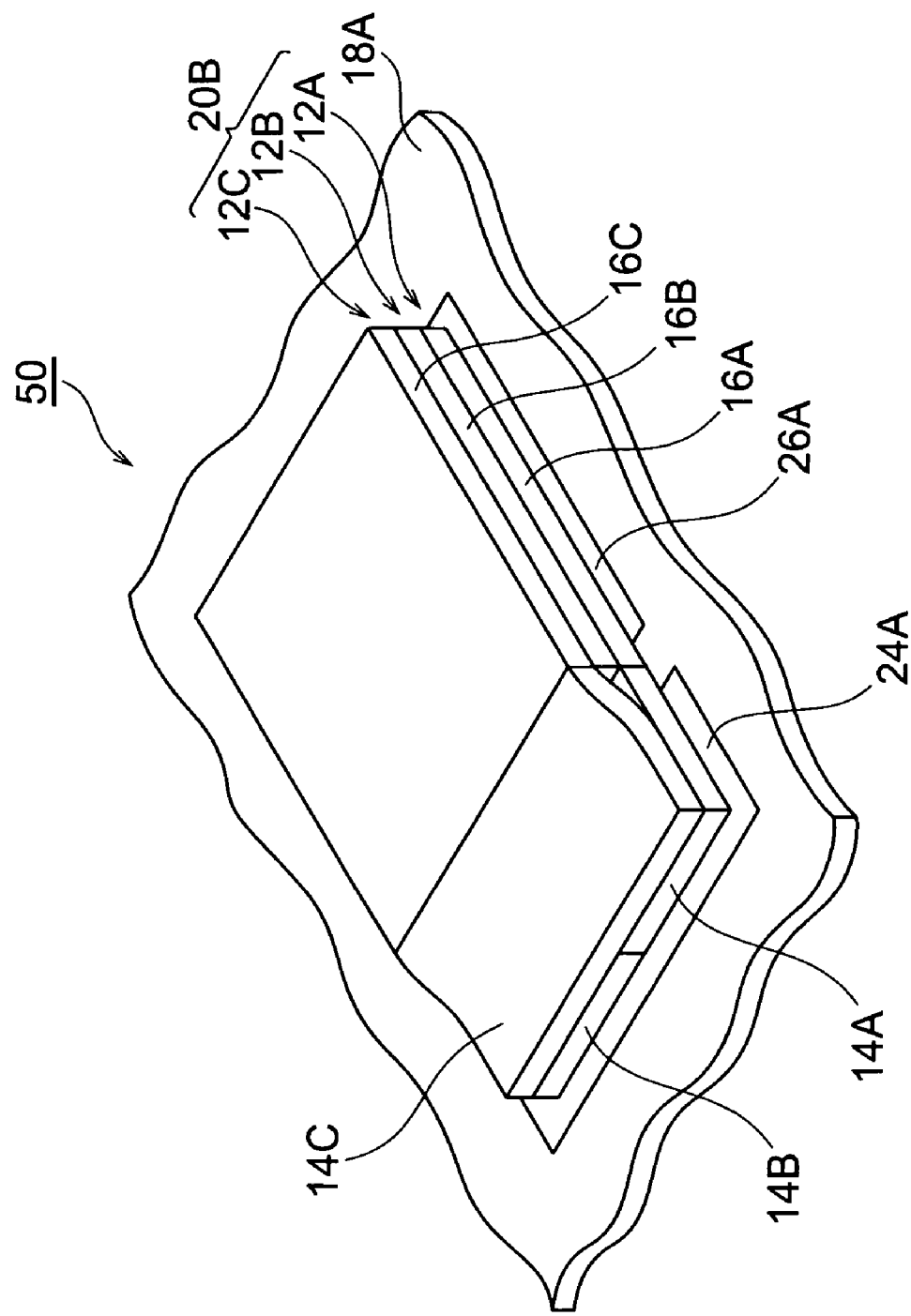
FIG. 4 is a perspective view showing the electrolytic capacitor in accordance with a second embodiment.

With reference to FIG. 4, the electrolytic capacitor in accordance with the second embodiment of the present invention will now be explained. FIG. 4 is a perspective view showing the electrolytic capacitor in accordance with the second embodiment.

This electrolytic capacitor 50 has a structure in which a laminate 20B constructed by successively laminating capacitor elements 12A, 12B, 12C on a substrate 18A is disposed on a substrate 18A. Namely, the electrolytic capacitor 50 is one in which the capacitor element 12C is further laminated on the electrolytic capacitor 10 shown in FIG. 1.

The capacitor element 12C includes a cathode terminal 16C having the same shape as that of cathode terminals 16A, 16B in the other capacitor elements 12A, 12B, whereas an anode terminal 14C is formed at an end part of the cathode terminal 16C. The anode terminal 14C has a width identical to that of the cathode terminal 16C. Namely, it has such a size as to cover both of the anode terminals 14A and 14B positioned thereunder. As in the first embodiment, the projection area $S_1$ of the anode terminal 14A onto the anode connecting part 24A and the projection area $S_2$ of the anode terminal 14B onto the anode connecting part 24A do not overlap each other. The projection area (not depicted) of the anode terminal 14C onto the anode connecting part 24A overlaps both of the projection areas $S_1$, $S_2$.

In thus configured electrolytic capacitor 50, even though three layers of capacitor elements 12A, 12B, 12C are laminated on the substrate 18A, substantially only two layers of anode terminals are connected to the anode connecting part 24A of the substrate 18A. Therefore, as in the above-mentioned electrolytic capacitor 10, the anode terminals 14A, 14B, 14C are connected to the anode connecting part 24A quite easily by welding or crimping.

The electrolytic capacitor in accordance with this embodiment is not restricted to the mode mentioned above, but may be in other modes. For example, the capacitor element 12C may be laminated under the capacitor elements 12A, 12B instead of thereabove. A plurality of capacitor elements 12C may be laminated at any position as well. In any case, anode terminals whose number is smaller than the number of laminated capacitor elements are connected to the anode connecting part 24A, whereby the laminate 20B constituted by capacitor elements is secured to the substrate 18A in a state more favorable than in a conventional electrolytic capacitor in which anode terminals having the same number as that of elements are laminated. However, welding and crimping tend to become physically difficult when the number of laminated capacitor elements 12C is too large. Therefore, in practice, the number of laminated capacitor elements 12C is preferably 1 to 2.

THIRD EMBODIMENT

Figure 5:
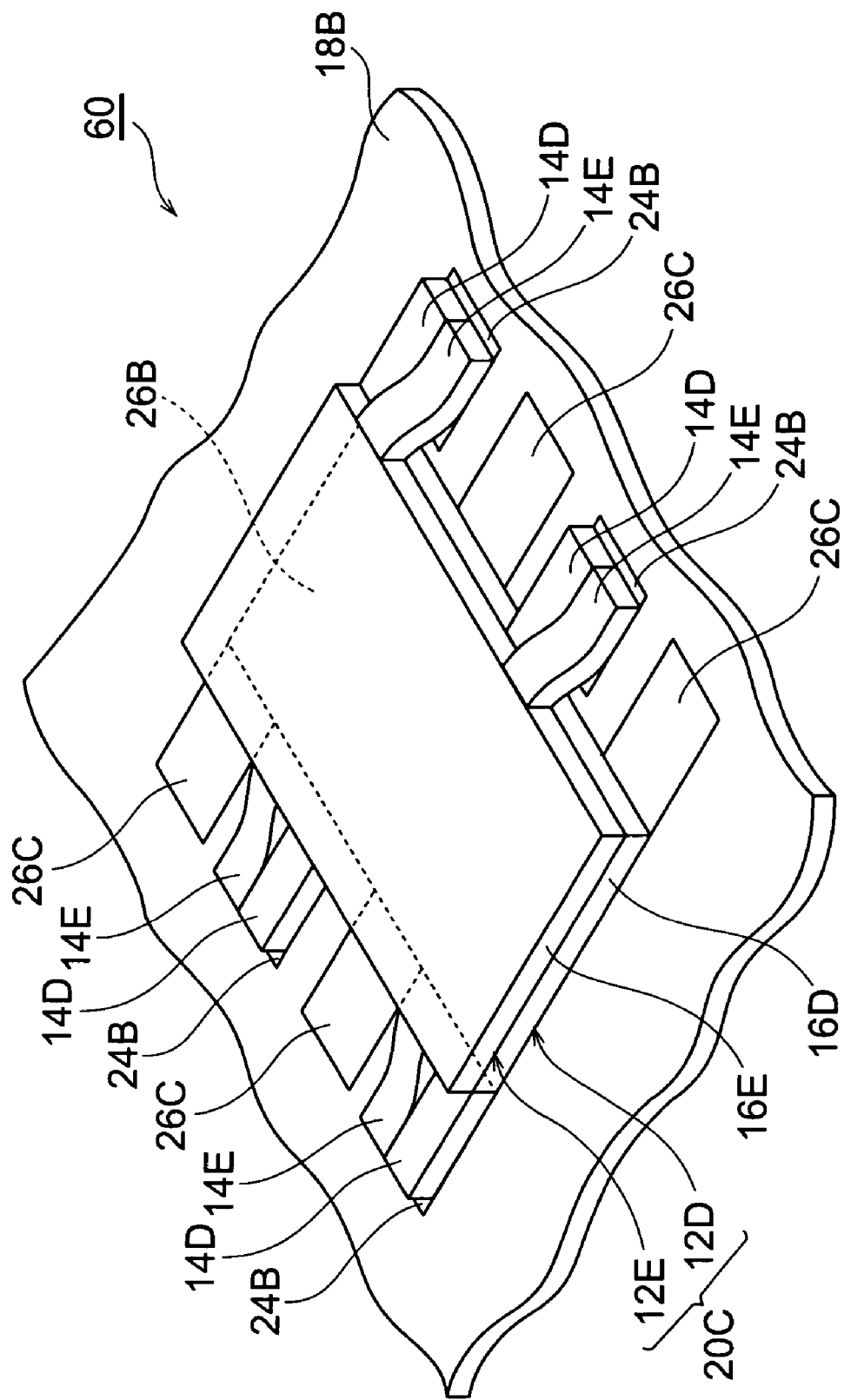
FIG. 5 is a perspective view showing the electrolytic capacitor in accordance with a third embodiment.

With reference to FIG. 5, the electrolytic capacitor in accordance with the third embodiment of the present invention will now be explained. FIG. 5 is a perspective view showing the electrolytic capacitor in accordance with the third embodiment.

This electrolytic capacitor 60 has such a structure that a laminate 20C constituted by capacitor elements 12D and 12E is mounted on a substrate 18B.

The substrate 18B includes a cathode connecting part 26B disposed on a main surface on which the laminate 20C is mounted. Four cathode take-out parts 26C are drawn out from longer sides of the cathode connecting part 26B. Anode connecting parts 24B are formed so as to alternate with the cathode take-out parts 26C. Through holes (not depicted) extending along the thickness of the substrate 18B are formed in the regions formed with the anode connecting parts 24B and cathode take-out parts 26C in the substrate 18B. These through holes connect the anode connecting parts 24B and cathode take-out parts 26C to connecting terminals, wiring, and the like (not depicted) formed on the rear face (the surface on the side opposite from the main surface) of the substrate. The substrate 18 is not restricted to one having such a planar structure, whereas a lead frame or the like including the anode connecting parts 24B and cathode connecting part 26B, for example, may be employed.

The capacitor element 12D has a cathode terminal 16D in a thin sheet form which appears rectangular when seen as a plane, and anode terminals 14D formed so as to be drawn out from longer sides of the cathode terminal 16D. Two anode terminals 14D are formed at each of the opposing longer sides of the cathode terminal 16D, whereby a so-called multiterminal capacitor element is provided. The four anode terminals 14D are positioned symmetrical about the point of gravity of the cathode terminal 16D.

The capacitor element 12E has the same configuration as with the capacitor element 12D except that anode terminals 14E are formed so as to deviate from the anode terminals 14D as will be explained later. The anode terminals 14E and cathode terminal 16E in the capacitor element 12E have respective sizes identical to those of the anode terminals 14D and cathode terminal 16D in the capacitor element 12D.

The laminate 20C is laminated such that the cathode terminal 16D in the capacitor element 12D and the cathode terminal 16E in the capacitor element 12E are overlaid on each other. Preferably, the cathode terminals are connected to each other by way of a conductive adhesive.

The laminate 20C is mounted on the substrate 18B, whereby the electrolytic capacitor 60 is constructed. The cathode terminal 16D of the lowermost capacitor element 12D is connected to the cathode connecting part 26B in the substrate 18B so as to be overlaid thereon. Their connection is also established by way of a conductive adhesive or the like.

The four anode terminals 14D in the laminate 20C are connected to the four anode connecting parts 24B in the substrate 18B, respectively. Similarly, the four anode terminals 14E are connected to four anode connecting parts 24B in the substrate 18B, respectively. In other words, a pair of the anode terminals 14D and 14E are connected to one anode connecting part 24B of the substrate 18B. The anode terminals 14D, 14E are connected to the anode connecting part 24B by welding or crimping.

The anode terminals 14D and 14E connected to one anode connecting part 24B satisfy the following relationship. Namely, the anode terminal 14D opposes a partial region of the anode connecting part 24B, whereas the anode terminal 14E opposes a region different from the partial region. Namely, the projection area of the anode terminal 14D onto the anode connecting part 24B and the projection area of the anode terminal 14E onto the anode connecting part 24B deviate from each other and include respective regions which do not overlap each other. These two projection areas may partly overlap each other as well.

Since the anode terminals 14D and 14E in the laminate 20C are connected to the anode connecting part 24B as mentioned above, substantially only one layer of anode terminal is laminated on one anode terminal 14D in spite of the fact that two layers of capacitor elements 12D and 12E are laminated on the substrate 18B. Therefore, the anode terminals 14D and 14E can be connected to the anode connecting part 24B quite easily by welding or crimping. As a result, the laminate 20C is secured onto the substrate 18B in a favorable state.

Three or more layers of capacitor elements can be laminated on the substrate 18 in the electrolytic capacitor in accordance with this embodiment as well. In this case, it will be preferred if the respective projection areas of anode terminals of the laminated capacitor elements onto the anode connecting part 24B hardly overlap each other. From the viewpoint of connection between the anode terminals and the anode connecting part 24B, the number of laminated layers is preferably 2 to 5.

FOURTH EMBODIMENT

Figure 6:
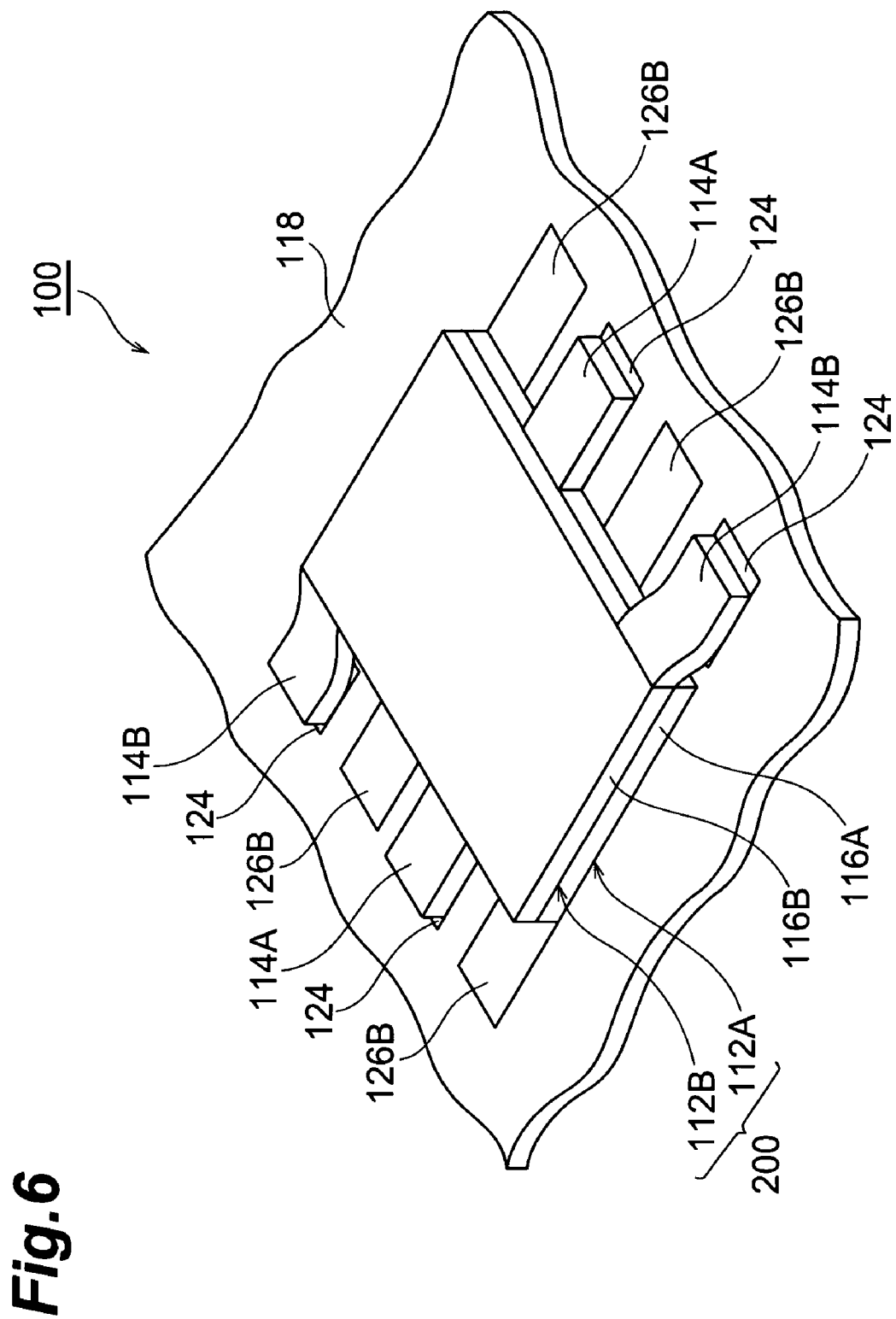
FIG. 6 is a perspective view showing the electrolytic capacitor in accordance with a fourth embodiment.
Figure 7:
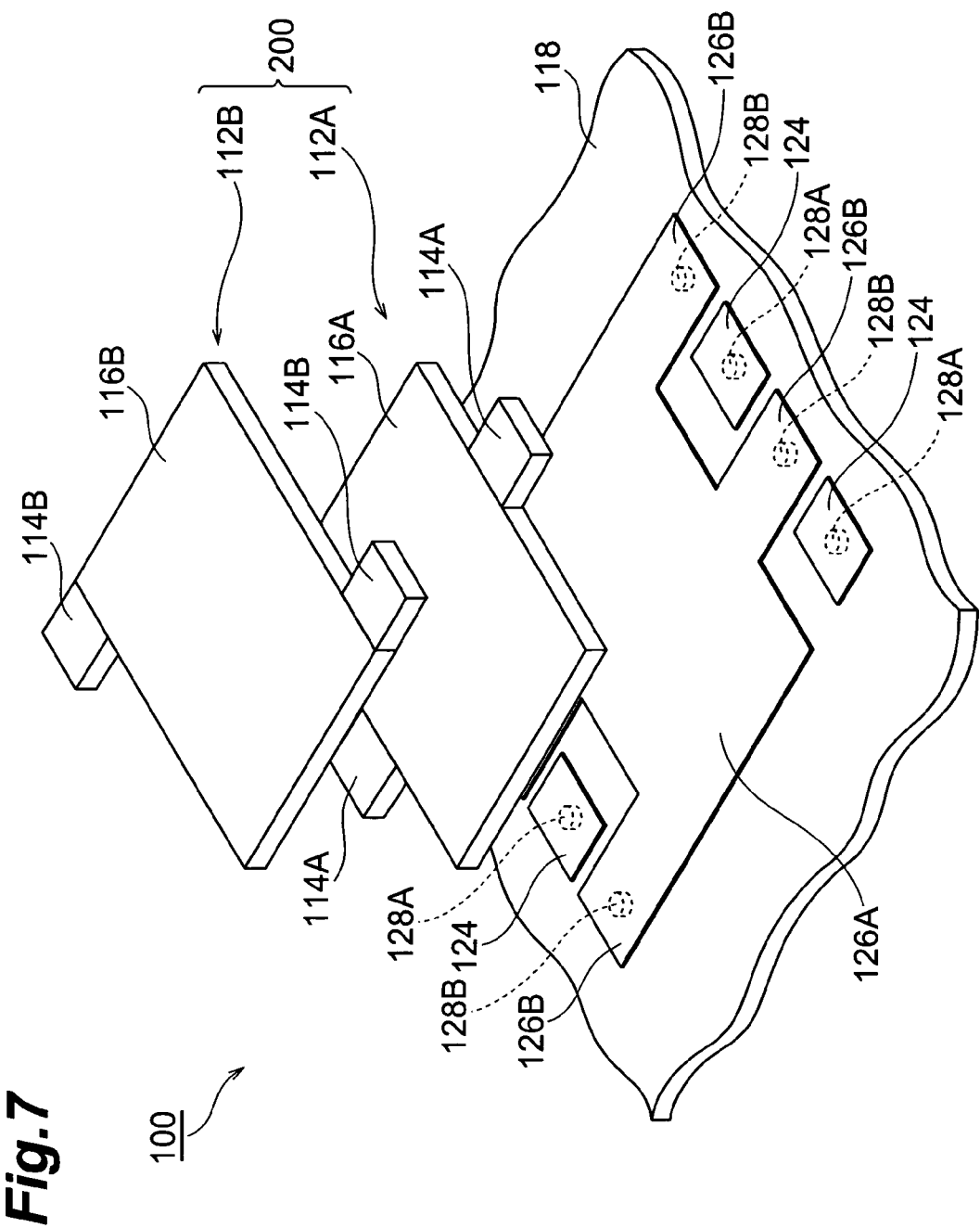
FIG. 7 is an exploded perspective view of the electrolytic capacitor shown in FIG. 6.

With reference to FIGS. 6 and 7, the electrolytic capacitor in accordance with the fourth embodiment of the present invention will now be explained. FIG. 6 is a perspective view showing the electrolytic capacitor in accordance with the fourth embodiment of the present invention. FIG. 7 is an exploded perspective view of the electrolytic capacitor shown in FIG. 6.

This electrolytic capacitor 100 comprises a substrate 118, and a laminate 200 mounted thereon and constituted by capacitor elements 112A and 112B.

The substrate 118 includes a cathode connecting part 126A disposed on a main surface on which the laminate 200 is mounted. Two cathode take-out parts 126B are drawn out from each of opposing longer sides in the cathode connecting part 126A. Anode connecting parts 124 are formed adjacent the cathode take-out parts 126B. Namely, the cathode take-out parts 126B and anode connecting parts 124 alternate with each other.

The substrate 118 is formed with through holes 128A and 128B extending along the thickness at respective positions corresponding to the anode connecting parts 124 and cathode take-out parts 126B. The through holes 128A and 128B connect the anode connecting parts 124 and cathode take-out parts 126B to connecting terminals, wiring, and the like (not depicted) formed on the rear face (the surface on the side opposite from the main surface) of the substrate 118.

The capacitor element 112A has a cathode terminal 116A in a thin sheet form which appears rectangular when seen as a plane, and anode terminals 114A formed so as to project from longer sides of the cathode terminal 116A. One anode terminal 114A is formed at each of the opposing longer sides of the cathode terminal 116A, whereby a so-called multiterminal capacitor element is provided. The anode terminals 114A at the respective sides are positioned symmetrical about the point of gravity of the cathode terminal 116A.

The capacitor element 112B has a configuration similar to that of the capacitor element 112A. However, as will be explained later, the anode terminals 114B in the capacitor element 112B are formed at positions which do not overlap the anode terminals 114A in the capacitor element 112A in the laminating direction when the capacitor elements 112A and 112B are overlaid on each other.

The capacitor elements 112A and 112B are laminated, so as to construct the laminate 200. In the laminate 200, the cathode terminals 116A and 116B are connected to each other by way of a conductive adhesive. The anode terminals 114A and 114B are arranged such that they do not overlap each other when the laminate 200 is seen as a plane. The anode terminals 114A and 114B alternate with each other at each side.

The cathode terminal 116A in the lowermost capacitor element 112A in the laminate 118 is connected to the cathode connecting part 126 in the substrate 118. They are connected to each other by way of a conductive adhesive.

The anode terminals 114A, 114B are connected to a plurality of anode connecting parts 124 formed on the substrate 118 at their corresponding positions, respectively. Namely, only one anode terminal is connected to one anode connecting part 124.

Thus, only one layer of anode terminal is connected to each anode connecting part 124 in the electrolytic capacitor 100 in spite of the fact that two layers of capacitor elements 112A and 112B are laminated on the substrate 118. Therefore, the anode terminals 114A, 114B can easily be connected to the anode connecting part 124. As a result, the laminate 200 is secured to the substrate 118 in a quite favorable state.

The electrolytic capacitor in accordance with this embodiment is not always restricted to one having the above-mentioned configuration, but may be modified in various manners. For example, the number of terminals in each capacitor element is not limited to 2, but may be any number. In this case, the number of anode connecting parts on the substrate is increased or decreased according to the number of anode terminals in the element.

The number of capacitor elements laminated on the substrate is not limited to 2, but may be 3 or more. The anode terminals are connected to different anode connecting parts on the substrate, respectively, in this case as well.

The electrolytic capacitor in accordance with this embodiment may partly include a structure in which a plurality of anode terminals are connected to each other in an overlapping manner. In this case, the number of connected anode terminals is preferably such that connections can favorably be established, specifically about 2 to 5.

Though the above-mentioned embodiments use the substrate 118 as the object to be connected, the object is not restricted to substrates in particular as long as it has a structure connectable to anode and cathode terminals of the capacitor element. For example, lead frames and the like can be used.

EXAMPLES

In the following, the present invention will be explained in more detail with reference to Examples, which do not always restrict the present invention.

[Making of Electrolytic Capacitor]

Example 1

First, from an aluminum sheet having a thickness of 100 µm roughened and formed with an aluminum oxide film, an aluminum foil was cut out into a rectangular form. Subsequently, the aluminum foil was cut into a form having a protrusion to become an anode terminal 14A at one end. An insulating resin layer having a width of 0.5 mm was formed at the base part of the protrusion.

Next, the region excluding the protrusion in this aluminum foil was dipped in an aqueous solution containing 3 wt % of ammonium adipate adjusted to pH 6.0, and the surface layer portion of the dipped part of the aluminum foil was oxidized under a chemical processing voltage of 6 V, whereby an aluminum oxide film was formed at the surface layer portion.

Thereafter, on the surface of the aluminum foil formed with the aluminum oxide film, an electrolyte layer made of polypyrrole was formed by chemically oxidative polymerization. The chemically oxidative polymerization was performed under the following condition. Namely, the aluminum foil was set in an ethanol/water mixed solution cell containing 0.25 mol/L of refined pyrrole monomer, 0.01 mol/L of sodium alkyl naphthalene sulfonate, and 0.05 mol/L of iron sulfate (III), and was stirred for 20 minutes, so as to advance the chemically oxidative polymerization. This operation was repeated three times, whereby an electrolyte layer made of a solid polymer was formed on the aluminum oxide film in the aluminum foil.

Subsequently, a carbon paste layer and a silver paste layer were successively formed on the surface of the electrolyte layer by dip coating, so as to yield a cathode terminal 16A, whereby a capacitor element 12A including the anode terminal 14A and cathode terminal 16A shown in FIGS. 1 and 2 was obtained. In this element 12A, the total length of the cathode and anode terminals was 0.5 cm, the width of the cathode terminal was 0.7 cm, and the width of the anode terminal was 0.3 cm.

Next, as shown in FIG. 2, the capacitor element 12A was superposed on the substrate 18A including the cathode connecting part 26A and anode connecting part 24A. Thereafter, a capacitor element 12B having a form symmetrical to the capacitor element 12A with an anode terminal disposed at a different position was superposed on the capacitor element 12A. Then, by way of a conductive adhesive, the cathode connecting part 26A was connected to the cathode terminal 14A, and the cathode terminals were connected to each other; whereas the anode terminals 14A, 14B in the elements 12A, 12B were welded to the anode connecting part. Thus, the electrolytic capacitor of Example 1 having the form shown in FIG. 1 was obtained. In thus obtained electrolytic capacitor, the number of anode terminals connected to one anode connecting part (hereinafter referred to as "anode overlapping number") was 1.

Comparative Example 1

A capacitor element 52 including an anode terminal 54 and a cathode terminal 56 was made as in Example 1 except that an aluminum foil in which an insulating resin layer having a width of 0.5 mm was formed at a boundary with respect to a part to become an anode terminal was used without cutting after an aluminum foil having the size identical to that used for making the electrolytic capacitor in accordance with Example 1 was prepared.

Figure 8:
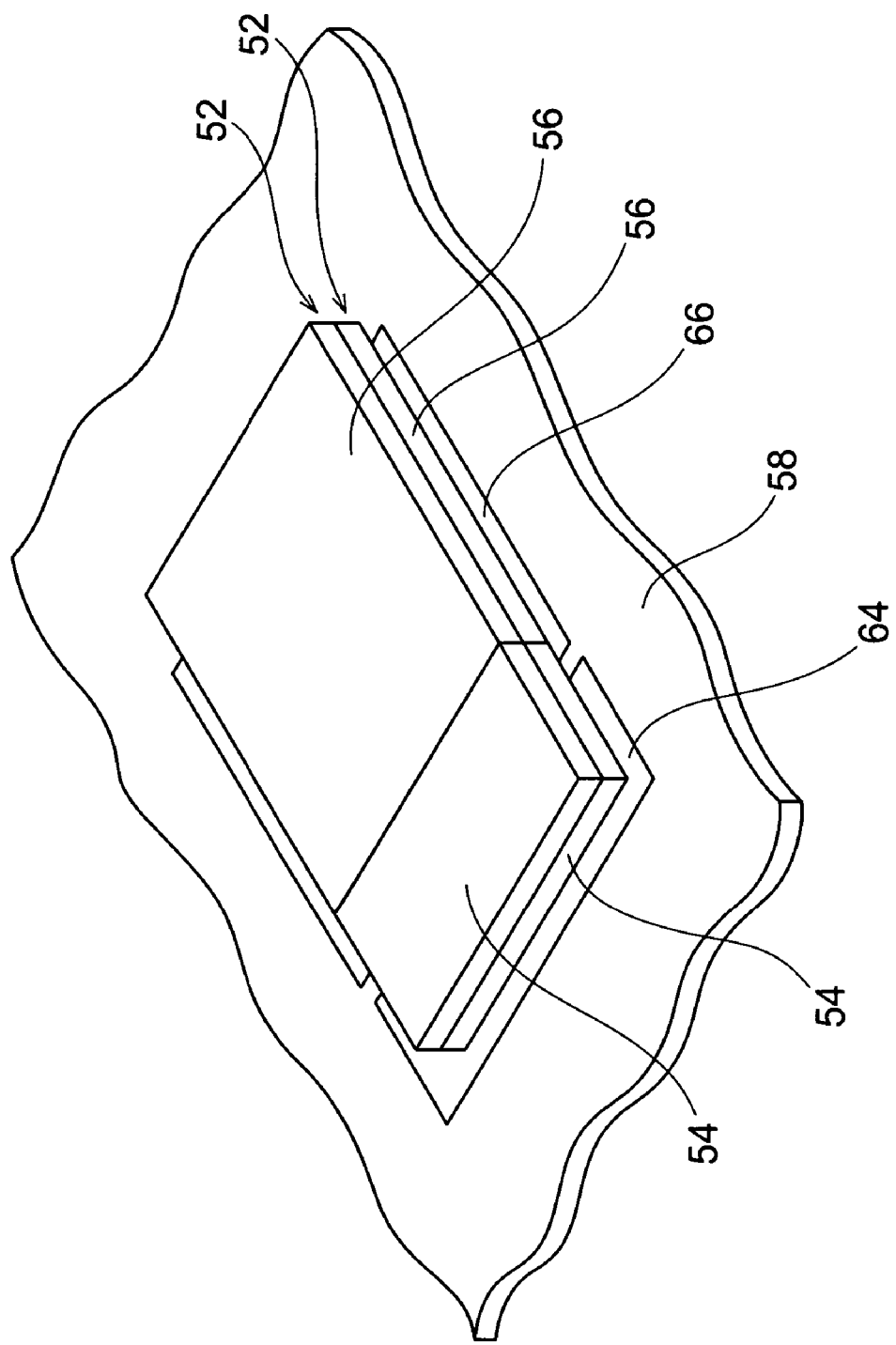
FIG. 8 is a perspective view showing the electrolytic capacitor in accordance with Comparative Example 1.

Two capacitor elements 52 were disposed in a laminated state on a substrate 58 including an anode connecting part 64 and a cathode connecting part 66. Here, with a conductive adhesive, the cathode terminals 56 were connected to the cathode connecting part 66 and to each other. The respective anode terminals 54 of the elements 52 and the anode connecting part 64 were connected to each other by welding. Thus, the electrolytic capacitor of Comparative Example having the form shown in FIG. 8 was obtained. The anode overlapping number in thus obtained electrolytic capacitor was 2.

Example 2

First, from an aluminum sheet having a thickness of 100 μm roughened and formed with an aluminum oxide film, an aluminum foil was cut out into a rectangular form. Subsequently, the aluminum foil was cut into a form having a protrusion to become an anode terminal 214A.

Figure 9:
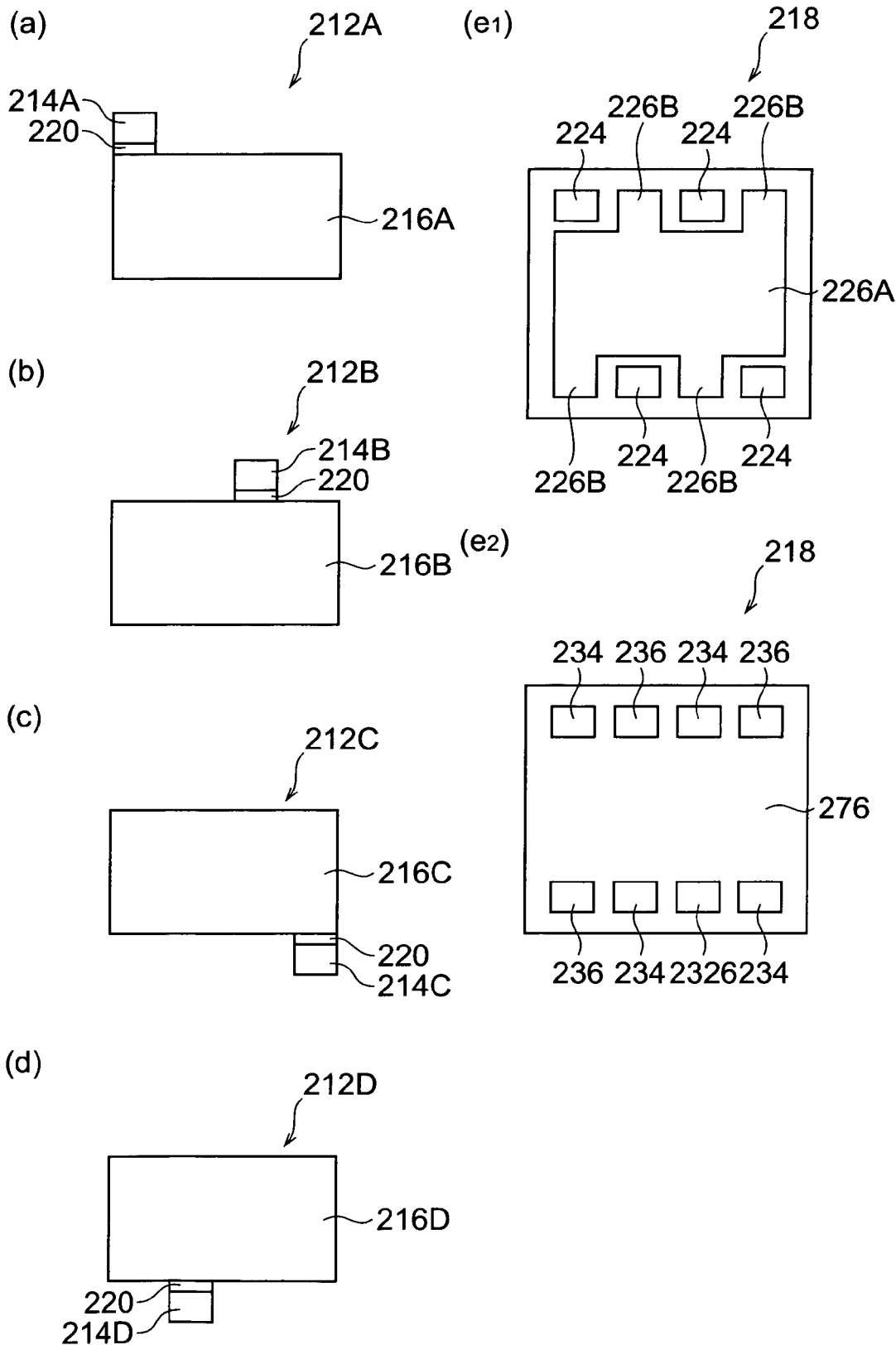
FIG. 9 is a plan view showing the configuration of the electrolytic capacitor in accordance with Example 2.

An insulating resin layer 220 having a width of 0.5 mm was formed at the base part of the protrusion in the aluminum foil. Thereafter, an aluminum oxide film, an electrolyte layer, a carbon paste layer, and a silver paste layer were successively formed in the region excluding the protrusion in the aluminum foil as in Example 1, so as to make a cathode terminal 216A. This yielded a capacitor element 212A having a form shown in FIG. 9(a) including the anode terminal 214A and the cathode terminal 216A.

Next, in the same method as with the capacitor element 212A, capacitor elements 212B (FIG. 9(b)), 212C (FIG. 9(c)), and 212D (FIG. 9(d)) having respective anode terminals 214B, 214C, and 214D disposed at different positions were manufactured.

Thereafter, these elements were laminated in this order such that their cathode terminals (216A, 216B, 216C, 126D) were overlaid on each other. Thus obtained laminate was secured onto a substrate 218 (FIG. 9(e1)), whereby the electrolytic capacitor of Example 2 was obtained. This substrate 218 had such a structure that the anode connecting parts 224, cathode connecting part 226A, and cathode take-out parts 226B were formed on the main surface on which the laminate was mounted.

The laminate was secured to the substrate 218 in the following manner. Namely, the cathode terminal 216A in the lowermost capacitor element 212A and the cathode connecting part 216A in the substrate 218 were bonded to each other with a conductive adhesive, the respective cathode terminals of the elements were bonded to each other with a conductive adhesive, and the respective anode terminals in the elements were welded to different anode connecting parts 224 on the substrate 218. In thus obtained electrolytic capacitor, the respective anode terminals of the elements did not overlap each other. The substrate 218 was formed with a plurality of anode connecting terminals 234 and a plurality of cathode connecting terminals 236 on the surface opposite from the surface mounted with the laminate (FIG. 9(e2)).

Comparative Example 2

First, from an aluminum sheet having a thickness of 100 μm roughened and formed with an aluminum oxide film, an aluminum foil was cut out into a rectangular form. Subsequently, the aluminum foil was cut into a form having two protrusions to become anode terminals 254 at one of opposing longer sides.

Figure 10:
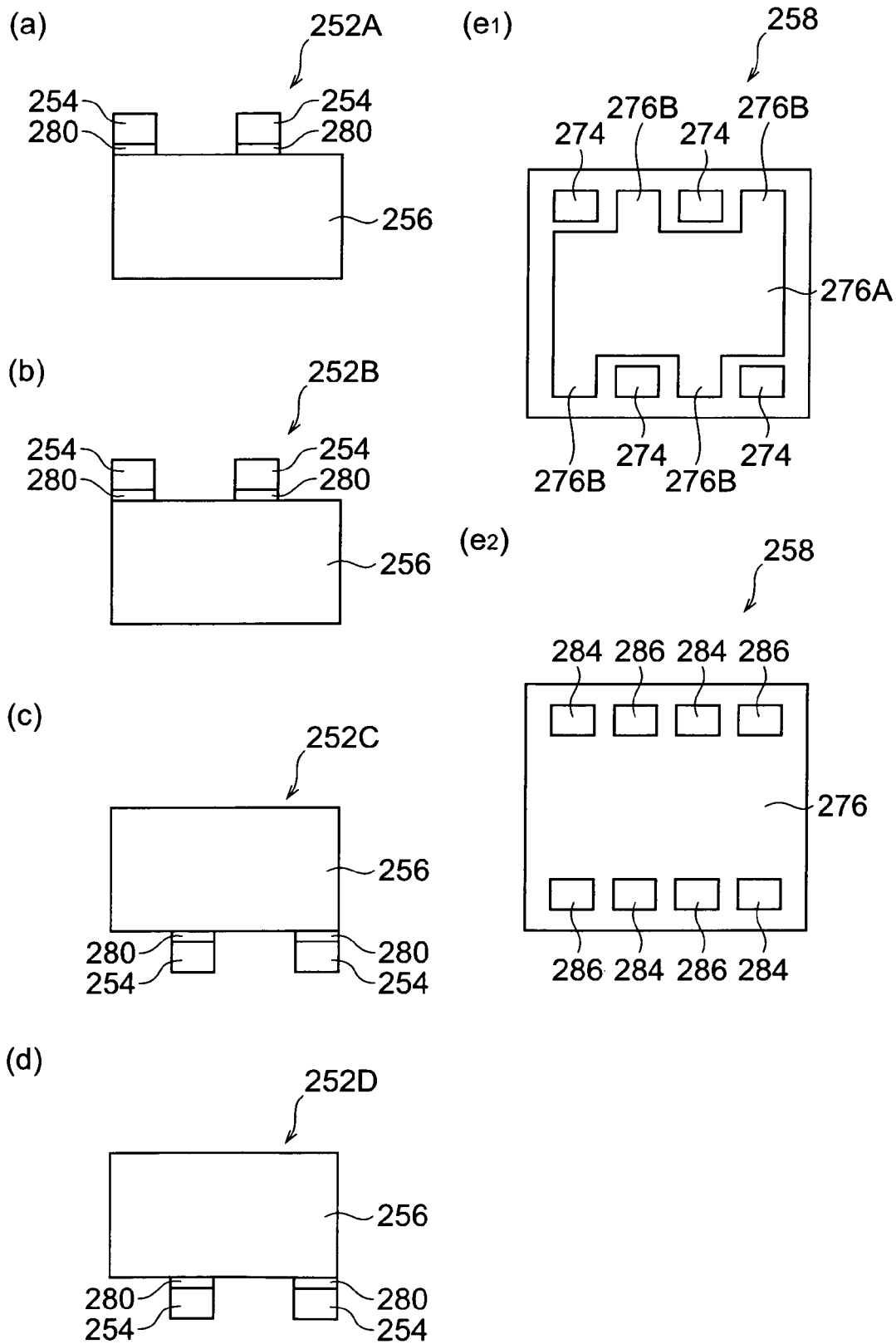
FIG. 10 is a plan view showing the configuration of the electrolytic capacitor in accordance with Comparative Example 2.

An insulating resin layer 280 having a width of 0.5 mm was formed at the base part of the protrusion in the aluminum foil. Thereafter, an aluminum oxide film, an electrolyte layer, a carbon paste layer, and a silver paste layer were successively formed in the region excluding the protrusion in the aluminum foil as in Example 1, so as to form a cathode terminal 256. This yielded a capacitor element 252A having a form shown in FIG. 10(a) including the anode terminals 254 and the cathode terminal 256.

Three capacitor elements having the form identical to that mentioned above were further manufactured. Thus obtained capacitor elements were laminated in the order of the capacitor elements 252A to 252D, so as to yield a laminate. At the time of lamination, the capacitor elements 252A and 252B were oriented in the same direction. On the other hand, the capacitor elements 252C and 252D were oriented in the same direction. This laminate was secured onto a substrate 258 (FIG. 10(e1)), whereby the electrolytic capacitor of Comparative Example 2 was obtained. This substrate 258 had such a structure that anode connecting parts 274, a cathode connecting part 276A, and cathode take-out parts 276B were formed on the main surface on which the laminate was mounted.

The laminate was secured to the substrate 258 in the following manner. Namely, the cathode terminal 256 in the lowermost capacitor element 252A and the cathode connecting part 276A in the substrate 258 were bonded to each other with a conductive adhesive, and the respective cathode terminals of the elements were bonded to each other with a conductive adhesive. Further, the anode terminals 254 in the elements were welded to different anode connecting parts 274 on the substrate 258. In thus obtained electrolytic capacitor, the anode terminal overlapping number was 2. The substrate 258 was formed with a plurality of anode connecting terminals 284 and a plurality of cathode connecting terminals 286 on the surface opposite from the surface mounted with the laminate (FIG. 10(e2)).

[Measurement of Capacitance, ESR, and ESL]

Using an impedance analyzer 4194A and a network analyzer 8753D which were manufactured by Agilent Technologies Inc., the capacitance and $S_{21}$ characteristic of each of the electrolytic capacitors in accordance with Examples 1 and 2 and Comparative Examples 1 and 2 were determined. An equivalent circuit simulation was performed according to thus obtained $S_{21}$ characteristic, so as to determine ESR and ESL values. Table 1 lists thus obtained results. Each capacitance was a value at 120 Hz, whereas each ESR was a value at 100 kHz.

[Measurement of Fraction Defective in Welding]

Twenty samples each of the electrolytic capacitors in accordance with Examples 1 and 2 and Comparative Examples 1 and 2 were made, and those whose capacitance was smaller than a predetermined value, and those whose ESR was 50 mΩ or greater were determined defective. Then, the ratio (%) of those determined defective in 20 samples was calculated in each electrolytic capacitor. Thus obtained value was defined as the fraction defective in welding. The values of capacitance, ESR, and ESL in the following table are nearly average values of those in samples determined nondefective.

TABLE 1

| Electrolytic capacitor | Number of anode terminals | Anode terminal number | Anode overlapping number | Capacitance (μF) | ESR (m Ω) | ESL (pH) | Fraction defective in welding (%) |
|---|---|---|---|---|---|---|---|
| Example 1 | 2 | 2 | 1 | 120 | 4 | 110 | 20 |
| Example 2 | 8 | 4 | 1 | 245 | 4.5 | 55 | 25 |
| Comparative Example 1 | 2 | 2 | 2 | 120 | 4.5 | 120 | 45 |
| Comparative Example 2 | 8 | 4 | 2 | 250 | 5 | 48 | 60 |

Table 1 shows that the electrolytic capacitor of Example 1 did not yield any practically problematic differences in both ESR and ESL from the electrolytic capacitor of Comparative Example 1, though the electrode width of each capacitor element was smaller than that in the latter. Also, the electrolytic capacitor of Example 2 was found to exhibit no practically problematic differences in both ESR and ESL from the electrolytic capacitor of Comparative Example 2, though the number of electrodes in each capacitor element was smaller than that in the latter. Thus, the electrolytic capacitor elements determined nondefective yielded practically unproblematic results in terms of ESR and ESL. Also, the fraction defective in welding was remarkably smaller in the electrolytic capacitors in accordance with Examples 1 and 2 in which the anode overlapping number was 1 than in the electrolytic capacitors of Comparative Examples 1 and 2 in which the anode overlapping number was 2.

As explained in the foregoing, the present invention can provide a laminated capacitor in which anode terminals of capacitor elements are sufficiently secured to a terminal of an object to be connected.

The invention claimed is:

1. A capacitor comprising:
    a laminate constituted by a plurality of laminated capacitor elements each including an anode terminal and a cathode terminal; and
    an object including pairs of anode and cathode terminals to which the anode and cathode terminals are electrically connected,
    wherein the anode terminal of one capacitor element in the laminate oppose a partial region in the terminal of the object, and the anode terminal of another capacitor element oppose a region different from the partial region in the terminal of the object; and at least one of the pairs of the anode and cathode terminals alternate with each other on one side of the laminate.

2. A capacitor according to claim 1, wherein the respective anode terminals in one capacitor element and another capacitor element do not overlap each other in the laminating direction of the capacitor elements.

3. A capacitor according to claim 2, wherein the respective cathode terminals in the plurality of capacitor elements are connected to each other by way of a conductive adhesive.

4. A capacitor according to claim 1, wherein the respective cathode terminals in the plurality of capacitor elements are connected to each other by way of a conductive adhesive.

5. A capacitor according to claim 1, wherein the anode terminal of each capacitor element is connected to the respective object anode terminal by welding.

6. A capacitor comprising:
    a laminate constituted by a plurality of laminated capacitor elements each including an anode terminal and a cathode terminal; and
    an object including pairs of anode and cathode terminals to which the anode and cathode terminals are electrically connected,
    wherein the respective anode terminals of one capacitor element and another capacitor element in the laminate are connected to different anode terminals of the object; and at least one of the pairs of the anode and cathode terminals alternate with each other on one side of the laminate.

7. A capacitor according to claim 6, wherein the respective cathode terminals in the plurality of capacitor elements are connected to each other by way of a conductive adhesive.

8. A capacitor according to claim 7, wherein the anode terminals in the capacitor elements are connected to the respective terminals in the object by welding.

9. A capacitor according to claim 6, wherein the anode terminals in the capacitor elements are connected to the respective terminals in the object by welding.

* * * * *